United States Patent [19]

Vincent et al.

[11] 3,868,411
[45] Feb. 25, 1975

[54] ISOBUTYL CYCLOHEXENYL COMPOUNDS ALPHA (P-ISOBUTYL-CYCLOHEXENYL) ALKANOIC ACIDS

[75] Inventors: Michel Vincent, Bagneux; Georges Remond, Paris; Pierre Desnoyers, Fontenay-Aux, Roses, all of France

[73] Assignee: Societe en nom collectif Science Union Et Cie, Societe Francaise De Recherche, Medicale-Suresnes, France

[22] Filed: July 15, 1970

[21] Appl. No.: 55,292

[30] Foreign Application Priority Data
July 22, 1969  Great Britain .................... 36734/69

[52] U.S. Cl. ...... 260/514 L, 260/239 A, 260/239 B, 260/239 E, 260/247.7 H, 260/268 C, 260/293.65, 260/326.5 E, 260/468 L, 260/557 R, 424/317
[51] Int. Cl. ............................................. C07c 61/22
[58] Field of Search ...................... 260/514 R, 514 L

[56] References Cited
FOREIGN PATENTS OR APPLICATIONS
971,700  9/1964  Great Britain

*Primary Examiner*—Donald G. Daus
*Assistant Examiner*—Jose Tovar
*Attorney, Agent, or Firm*—Gordon W. Hueschen

[57] ABSTRACT

Isobutyl cyclohexenyl compounds of the formula:

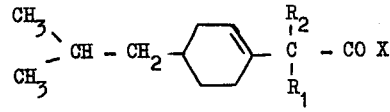

wherein $R_1$ is hydrogen or lower alkyl; $R_2$ is lower alkyl, and X is loweralkoyloxy, hydroxyl, or

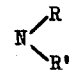

wherein R is hydrogen, hydroxyl or lower alkyl, R' is hydrogen or lower alkyl, or X is aziridino, azetidino, pyrrolidino, piperidino, hexamethylene-imino, morpholino, piperazino, or each of these heterocyclic radicals substituted by lower alkyl.

These compounds possess fibrinolytic and thrombolytic properties and decrease stickiness and aggregation of the thrombocytes.

7 Claims, No Drawings

ISOBUTYL CYCLOHEXENYL COMPOUNDS ALPHA (P-ISOBUTYL-CYCLOHEXENYL) ALKANOIC ACIDS

The present invention provides isobutyl cyclohexenyl compounds of the general formula I:

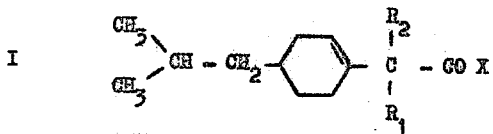

wherein
- $R_1$ is selected from the group consisting of: a hydrogen atom and a lower alkyl radical containing 1 to 5 carbon atoms inclusive in a linear or branched chain;
- $R_2$ is a lower alkyl radical containing 1 to 5 carbon atoms inclusive in a linear or branched chain;
- X is selected from the group consisting of: a lower alkyloxy radical containing 1 to 5 carbon atoms inclusive in a linear or branched chain, a hydroxyl radical and an amino radical

wherein:
- R is selected from the group consisting of: a hydrogen atom, a hydroxyl radical and a lower alkyl radical containing 1 to 5 carbon atoms inclusive in a linear or branched chain;
- R' is selected from the group consisting of: a hydrogen atom and a lower alkyl radical containing 1 to 5 carbon atoms inclusive in a linear or branched chain; and
- R + R' together with the nitrogen atom to which they are linked, are selected from the group consisting of aziridino, azetidino, pyrrolidino, piperidino, hexamethylene-imino, morpholino, piperazino radicals, and each of these heterocyclic radicals substituted by a lower alkyl radical containing 1 to 5 carbon atoms inclusive in a linear or branched chain.

The compounds of general formula I are new and are prepared in submitting to the Reformatsky reaction 4-isobutyl cyclohexanone of the formula II:

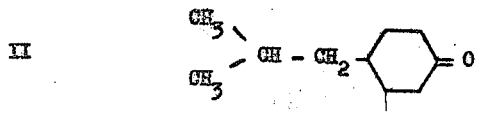

and an α-bromoester of the general formula III

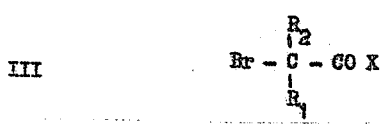

in which $R_1$ and $R_2$ have the meanings defined above and X represents a lower alkyloxy radical containing 1 to 5 carbon atoms inclusive in a linear or branched chain.

The resulting hydroxylated compounds of the general formula IV:

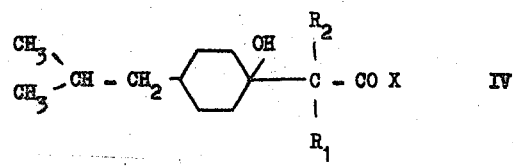

wherein $R_1$, $R_2$ and X have the same meanings as in the formula III, is then dehydrated by a method known per se, such for example, as the method described by G. A. R. KON and K. S. NARGUND [J. Chem. Soc. 2461 (1932)], yielding a derivative of the general formula I, wherein X is a lower alkyloxy radical containing 1 to 5 carbon atoms inclusive in a linear or branched chain. The last mentioned compound is reacted with a compound of the general formula HX, wherein X has the above defined meanings except a lower alkyloxy radical, in order to obtain the other compounds of the general formula I.

Moreover, the new compounds of the general formula I wherein X is a hydroxyl or a hydroxylamino radical, may be converted into addition salts with mineral bases, such for example, as bases of alkaline or alkaline earth metals, as sodium, potassium or calcium, hydroxide, carbonate or bicarbonate, or with organic bases as, for example, primary, secondary or tertiary amines such as mono-di- or tri-ethylamines, alkanolamines and dialkylamino alkanols. The new compounds of the general formula I wherein X is a basic radical may be converted into addition salts with mineral or organic acids, such, for example, as hydrochloric, hydrobromic, sulfuric, phosphoric, acetic, propionic, maleic, tartaric, citric, oxalic and benzoic acids. All these salts are included in the present invention.

All the compounds of the present invention contain at least one asymetric carbon atom and may be resolved by a method known per se, into optical isomers which are also included in the present invention.

The new compounds of the invention and their physiologically tolerable addition salts possess valuable pharmacological and therapeutic properties especially fibrinolytic and thrombolytic properties, and decrease stickiness and aggregation of the thrombocytes.

The fibrinolytic activity was studied by the method described by Von KAULLA in Am. J. Clin. Path. 29. 104 (1958). The new compounds, administered to the rat by intravenous route at doses of 10 to 30 mg/kg or by oral route at doses of 50 to 100 mg/kg decrease from 15 to 60 % the euglobulin lysis time, 10 to 60 minutes after the administration.

The thrombolytic activity was evidenced by the method of the standard clot of Von KAULLA [Thromb. Diath. Haem. 5, 489 (1961)]. The clot lysis can be observed at molar concentrations of 0.02 to 0.007 corresponding to 4,646 to 1.626 mg/ml.

The activity on the platelet stickiness was studied by the method of SALZMANN [J. Lab. Clin. Med. 62 724 (1923)]. It was found that the new compounds administered to the rabbit at 10 to 20 mg/kg I.V. and at 30 to 100 mg/kg, per os, decrease the platelet stickiness by 25 to 55 %.

The effect of the compounds of the invention on the platelet aggregation was evidenced by the photometric technic of BORN and O'BRIEN modified by SINAKOS and CAEN [Rev. Fr. E. Clin. Biol. 11, 538-41 (1966)].

The concentrations by 15 to 2000 γ/ml of the new compounds inhibit by 30 to 100 % the platelet aggregation provoked by adenosine diphosphate, thrombine or adrenaline in the human, rabbit or rat plasma.

The toxicity of the new products, studied in mice, has shown a $LD_{50}$ of 175 to 450 mg/kg intraperitoneally and of 880 to > 2000 mg/kg orally.

This low toxicity and the hereabove described pharmacological properties allow the use of the compounds of the invention in therapy, especially in the prevention and treatment of thromboembolic disease and arteriosclerosis.

The present invention also provides pharmaceutical compositions containing a compound of general formula I, or one of their physiologically tolerable salts, in admixture or conjunction with a suitable pharmaceutical carrier, such for example, as distilled water, glucose, lactose, talc, starch, magnesium stearate and cocoa butter. These pharmaceutical compositions may be in form of tablets, dragees, capsules, suppositories or solutions, in order to be administered by the oral, rectal or parenteral route, at doses of 10 to 500 mg 1 to 5 times a day.

The following example illustrates such a pharmaceutical preparation:

EXAMPLE (Tablets)

| | |
|---|---|
| Sodium α-(4-isobutyl-1-cyclohexen-1-yl)-Propionate | 100 mg |
| Lactose | 102 mg |
| Starch | 50 mg |
| Talc | 20 mg |
| Magnesium stearate | 3 mg |
| for 1 tablet to be drageified. | |

The following examples illustrate the invention, the melting points being determined in a capillary tube, unless otherwise stated.

EXAMPLE 1

Ethyl α-(4-isobutyl-1-cyclohexen-1-yl)-propionate

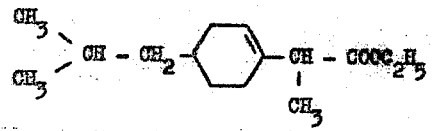

A ⅓ of a solution (a), containing 11.8 g (0,0648 mol) of ethylα-bromopropionate, 10 g (0.0648 mol) of 4-isobutyl-cyclohexanone, and 25 ml of anhydrous benzene was added to 4.65 g (0.0648 mol) of zinc cuttings in the presence of some mercuric chloride crystals and an iodine crystal. The Reformtmasky reaction was started with a slight heating and the remaining of the solution (a) was dropped into the reaction mixture maintained at the boiling point. The heating under reflux was maintained for 2 hours after the completion of the addition, then the reaction mixture cooled to the room temperature was poured on 54 g of cracked ice and 38 ml of acetic acid. The benzenic layer was washed with an aqueous solution of sodium bicarbonate, then with distilled water until neutral. After drying on calcium sulfate and filtration, the solution was concentrated to dryness and the residue was distilled under vacuum. 10.3 g of a mixture of ethyl α-(4-isobutyl-1-hydroxy-cyclohexyl)-propionate cis and trans isomers were obtained (B.P.0.07 mm Hg: 100°–102° C, yield 70 %).

A mixture comprising 10.3 g (0.0453 mol) of the above ester, 31 ml of benzene and 8 g (0.0566 mol) of phosphoric anhydride was stirred at reflux for 4 hours. After pouring off the benzene layer was distilled under reduced pressure. 6.8 g of ethyl α-(4-isobutyl-1-cyclohexen-1-yl)-propionate were obtained. (B.P./0.05 mm Hg: 80°–82° C, yield 63 %).

EXAMPLES 2–5

The following compounds were prepared according to the method described in Example 1:

2. Ethyl α-(4-isobutyl-1-cyclohexen-1-yl)-isobutyrate, BP/0.04mm Hg: 89°–92° C, starting from ethyl α-(4-isobutyl-1-hydroxy-cyclohexyl)-isobutyrate, B.P./0.07 mm Hg: 116°–120° C, yield 54.3 %, itself prepared from 4-isobutyl-cyclohexanone and ethyl α-bromo isobutyrate, yield 37.9 %.

3. Ethyl α-(4-isobutyl-1-cyclohexen-1-yl)-n-butyrate, B.P./0.1 mm Hg: 110°–114° C, yield 73.6 %, itself prepared from 4-isobutyl-cyclohexanone and ethyl α-bromobutyrate, yield 53.5 %.

4. Methyl α-(4-isobutyl-1-cyclohexen-1-yl)-propionate, B.P./0.02 mm Hg: 76°–80° C, starting from crude methyl α-(4-isobutyl-1-hydroxycyclohexyl)-propionate, yield 76.3 %, itself prepared from 4-isobutyl-cyclohexanone and methyl α-bromopropionate, yield 45 %.

5. Ethyl α-(4-isobutyl-1-cyclohexen-1-yl)-isovalerate, B.P./0.15 mm Hg: 104°–106° C, starting from ethyl α-(4-isobutyl-1-hydroxycyclohexyl)-isovalerate, B.P./0.1 mm Hg: 128°–130° C, yield 64.3 %, itself prepared from 4-isobutyl-cyclohexanone and ethyl α-bromoisovalerate, yield 34.5 %.

EXAMPLE 6

α-(4-isobutyl-1-cyclohexen-1-yl)-propionic acid

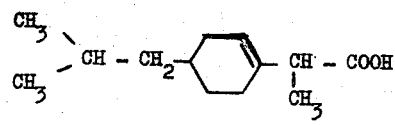

A solution of 6.8 g (0.0286 mol) of ethyl α-(4-isobutyl-1-cyclohexen-1-yl)-propionate, prepared in Example 1, in 315 ml of a 0.1 N sodium hydroxide solution and 800 ml of ethanol was heated at reflux for 7 hours. After concentration to dryness, the residue was dissolved into distilled water and the unsaponifiable products were extracted with n-pentane. The aqueous layer was acidified until pH 2.5 with 5 N HCl, and the precipitated acid was taken out with ether. The ethereal solution was washed with distilled water, dried on calcium sulfate, filtrated and concentrated to dryness. 5.2 g of α-(4-isobutyl-1-cyclohexen-1-yl)-propionic acid were obtained (yield: 83.8 %). This product was purified by distillation (B.P./0.04 mm Hg: 119°–119.5° C, yield of the purification: 85.7 %).

4.3 g (0.021 mol) of the above acid were dissolved in 21 ml of a N sodium hydroxide hydroethanolic solution (50/50). After concentration under reduced pressure, the crystalline residue was dried in a dessicator on phosphoric anhydride, and washed with anhydrous pentane. 4 g of sodium α-(4-isobutyl-1-cyclohexen-1- yl)-propionate were obtained (yield: 64.6 %). This sodium salt was titrated by perchloric acid in acetic acid medium; purity: 100 %.

EXAMPLES 7–9

The following compounds were prepared according to the method described in Example 6.

7. α-(4-isobutyl-1-cyclohexen-1-yl)-isobutyric acid, M.P. 37°–39° C, starting from ethyl α-(4-isobutyl-1-cyclohexen-1-yl)-isobutyrate described in Example 2; yield: 88.5 %. The corresponding sodium salt was prepared with a yield of 46 %.

8. α-(4-isobutyl-1-cyclohexen-1-yl)-n-butyric acid, B.P./0.01 mm Hg: 119°–120° C, starting from ethyl α-(4-isobutyl-1-cyclohexen-1-yl)-butyrate described in Example 3. The corresponding sodium salt is prepared with a yield of 78 %.

9. α-(4-isobutyl-1-cyclohexen-1-yl)-isovaleric acid, B.P./0.07 mm Hg: 118°–120° C, starting from ethyl α-(4-isobutyl-1-cyclohexen-1-yl)-isovaleric acid described in Example 5; yield 62.7 %. The corresponding sodium salt was prepared with a yield of 89 %.

EXAMPLE 10

α-(4-isobutyl-1-cyclohexen-1-yl)-propionohydroxamic acid

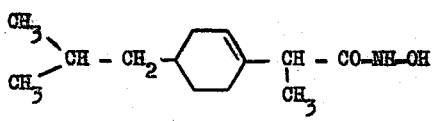

A hydroxylamine solution was prepared starting from 1.25 g (0.018 mol) of hydroxylamine hydrochloride and 0.414 g (0.018 atom g) of sodium in 15 ml of methanol. The sodium chloride formed was filtered and 2.7 g (0.012 mol) of methyl α-(4-isobutyl-1-cyclohexen-1-yl)-propionate and a solution of sodium methylate, prepared starting from 0.276 g of sodium (0.012 atom g) in 10 ml of methanol, were added to the filtrate while maintaining the temperature between 0° and 2° C. The mixture was stirred for 5 hours, allowed to stand overnight at room temperature and concentrated to dryness under reduced pressure. The residue was suspended in water, acidified by hydrochloric acid until pH 1 and the precipitated acid was extracted with ether. The ethereal solution was washed with water, dried over calcium sulfate, filtrated and concentrated to dryness under reduced pressure. The residue was crystallized from 5 ml of cyclohexane. 0.50 g of α-(4-isobutyl-1-cyclohexen-1-yl)-propionohydroxamic acid were obtained, M.P. (Kofler) 123°–124° C; yield: 18.5 %.

EXAMPLE 11

The following compound was prepared according to the method described in Example 10:

α-(4-isobutyl-1-cyclohexen-1-yl)-n-butyrohydroxamic acid, M.P. (Kofler: 128°–129° C, starting from ethyl α-(4-isobutyl-1-cyclohexen-1-yl)-n-butyrate and an ethanolic solution of hydroxylamine, with a yield of 25 %.

EXAMPLE 12

α-(4-isobutyl-1-cyclohexen-1-yl)-propionamide

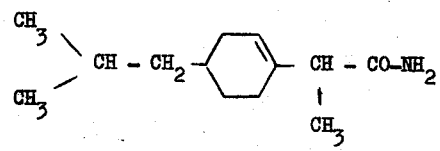

51 g (0.194 mol) of ethyl α-(4-isobutyl-1-cyclohexen-1-yl)-propionate, prepared according to Example 1, were dissolved in 400 ml of an ethanolic solution saturated with ammoniac. The mixture, placed in an autoclave was maintained at 100° C for 6 hours under stirring. After cooling at 20° C, the excess of ammoniac and ethanol was eliminated by distillation under atmospheric pressure. The unreacted ester was rectified under 0.1 mm Hg. The residue, taken off by 5 ml of boiling n-hexane, let crystallized by cooling 3.9 g of α-(4-isobutyl-1-cyclohexen-1-yl)-propionamide; M.P. (Kofler) 74°–75° C; yield: 8.5 %.

EXAMPLES 13–19

The following compounds were prepared according to the method described in Example 12;

13. α-(4-isobutyl-1-cyclohexen-1-yl)-N-methyl-propionamide, B.P./0.07 mm Hg: 154°–158° C, starting from ethyl α-(4-isobutyl-1-cyclohexen-1-yl)-propionate and a monomethylamine solution.

14. α-(4-isobutyl-1-cyclohexen-1-yl)-N, N-diethyl propionamide, B.P./0.08 mm Hg: 118°–120° C, starting from ethyl α-(4-isobutyl-1-cyclohexen-1-yl)-propionate and a diethylamine solution.

15. N-[α-(4-isobutyl-1-cyclohexen-1-yl)-n-butyryl]-morpholine, B.P./0.01 mm Hg: 148°–150° C, starting from ethyl α-(4-isobutyl-1-cyclohexen-1-yl)-n-butyrate and morpholine.

16. N-[α-(4-isobutyl-1-cyclohexen-1-yl)-propionyl]-pyrrolidine, B.P./0.045 mm Hg: 118°–120° C, starting from ethyl α-(4-isobutyl-1-cyclohexen-1-yl)-propionate and pyrrolidine.

17. N-[α-(4-isobutyl-1-cyclohexen-1-yl)-propionyl]-piperidine, B.P./0.045 mm Hg: 126°–128° C, starting from ethyl α-(4-isobutyl-1-cyclohexen-1-yl)-propionate and piperidine.

18. N-[α-(4-isobutyl-1-cyclohexen-1-yl)-propionyl]-hexamethylene-imine, B.P./0.08 mm Hg: 132°–134° C, starting from ethyl α-(4-isobutyl-1-cyclohexen-1-yl)-propionate and hexamethylene-imine.

19. N-methyl-N'-[α-(4-isobutyl-1-cyclohexen-1-yl)-propionyl]-piperazine, starting from ethyl α-(4-isobutyl-1-cyclohexen-1-yl)-propionate and N-methyl piperazine. N-methyl-N'-[α-(4-isobutyl-1-cyclohexen-1-yl)-propionyl]-piperazine hydrochloride melted (Kofler) at 230°–232° C.

What we claim is:

1. A compound selected from the group consisting of:

A. isobutyl cyclohexenyl compounds of the formula:

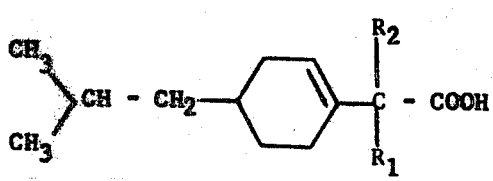

wherein:

R$_1$ is selected from the group consisting of hydrogen and lower-alkyl of 1 to 5 carbon atoms, inclusive;

R$_2$ is lower-alkyl of 1–5 carbon atoms, inclusive; and (B) physiologically tolerable salts with bases of alkali or alkaline earth metals.

2. A compound of claim 1 wherein the compound is an acid as defined in (A) thereof.

3. A compound of claim 1 which is α-(4-isobutyl-1-cyclohexen-1-yl)-propionic acid.

4. A compound of claim 1 which is: α-(4-isobutyl-1-cyclohexen-1-yl)-isobutyric acid.

5. A compound of claim 1 which is: α-(4-isobutyl-1-cyclohexen-1-yl)-n-butyric acid.

6. A compound of claim 1 which is: α-(4-isobutyl-1-cyclohexen-1-yl)-isovaleric acid.

7. A compound of claim 1 which is: sodium α-(4-isobutyl-1-cyclohexen-1-yl)propionate.

* * * * *